Figure 1:
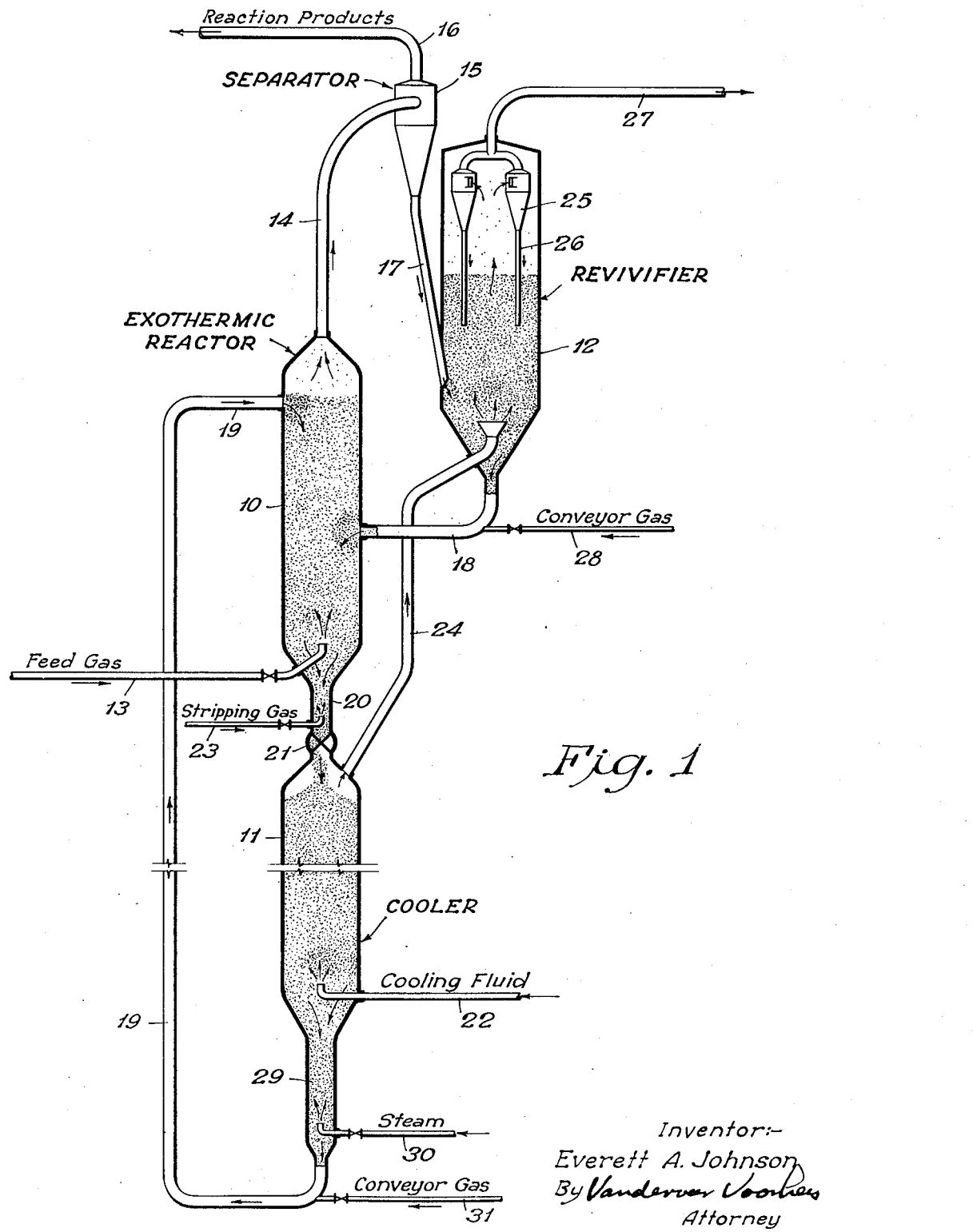

Patented Jan. 29, 1946

2,393,909

UNITED STATES PATENT OFFICE 2,393,909

CHEMICAL REACTION WITH FLUIDIZED SOLIDS

Everett A. Johnson, Park Ridge, Ill., assignor to Standard Oil Company, Chicago, Ill., a corporation of Indiana Application April 2, 1945, Serial No. 586,236

5 Claims. (Cl. 260—449.6)

This invention relates to gas phase reactions wherein a finely divided solid catalyst is contacted with reacting gases at elevated temperature to effect an exothermic reaction, which reaction tends to increase the temperature sufficiently to interfere with the desired reaction and/or to damage the catalyst. More specifically, the invention relates to a method of controlling catalytic conversion of hydrogen and carbon monoxide into useful products such as motor fuels and oxygenated compounds.

In the conduction of exothermic gas phase reactions, the problem of controlling the temperature within narrow limits has always been serious where a solid catalyst is employed. The transfer of heat from such a reaction zone is usually aggravated by the difficulty of maintaining the solid catalyst in satisfactory heat-transfer relation with the cooling means. Frequently the catalyst itself is of very low heat conductivity, particularly when it comprises a porous material of extensive surface. Some benefit has resulted from fluidizing solid catalysts which tends to maintain a substantially uniform temperature throughout the body of catalyst by distributing the heat from overheated areas of the system. Nevertheless, where large volumes of such fluidized catalysts are required, it is difficult to supply adequate cooling to maintain the optimum temperature conditions for the desired reaction and to avoid damage to the catalyst due to local overheating as by fusion or by chemical change or by deposition of undesirable by-products thereon. Thus, although the problem of maintaining a substantially uniform temperature throughout a catalyst mass is minimized by the use of a fluidized solid system, the transfer of heat of reaction from such a system to maintain the desired uniform temperature level still presents a problem.

It is an object of this invention to facilitate transfer of heat, chemically generated or absorbed, in fluidized solid system in general, and in particular to effect the dissipation of heat from exothermic systems, such as in the synthol reaction where carbon monoxide and hydrogen are converted to liquid products in the presence of a fluidized solid catalyst. A more specific object of the invention is to provide an apparatus and process for carrying out the synthol reaction wherein heat is continuously abstracted from the exothermic reaction zone to maintain a selected temperature level substantially uniformly throughout a mass of finely divided solid catalyst maintained in suspension by an upflowing stream of gas. These and additional objects will become apparent as the description of my invention proceeds.

Briefly, the objects of this invention are attained by employing a granular solid cooling material which is continuously passed through the exothermic reaction zone to abstract heat therefrom. This technique is broadly taught in my copending application, Serial No. 408,500, filed August 27, 1941, of which the present application is a continuation-in-part.

Figure 2:
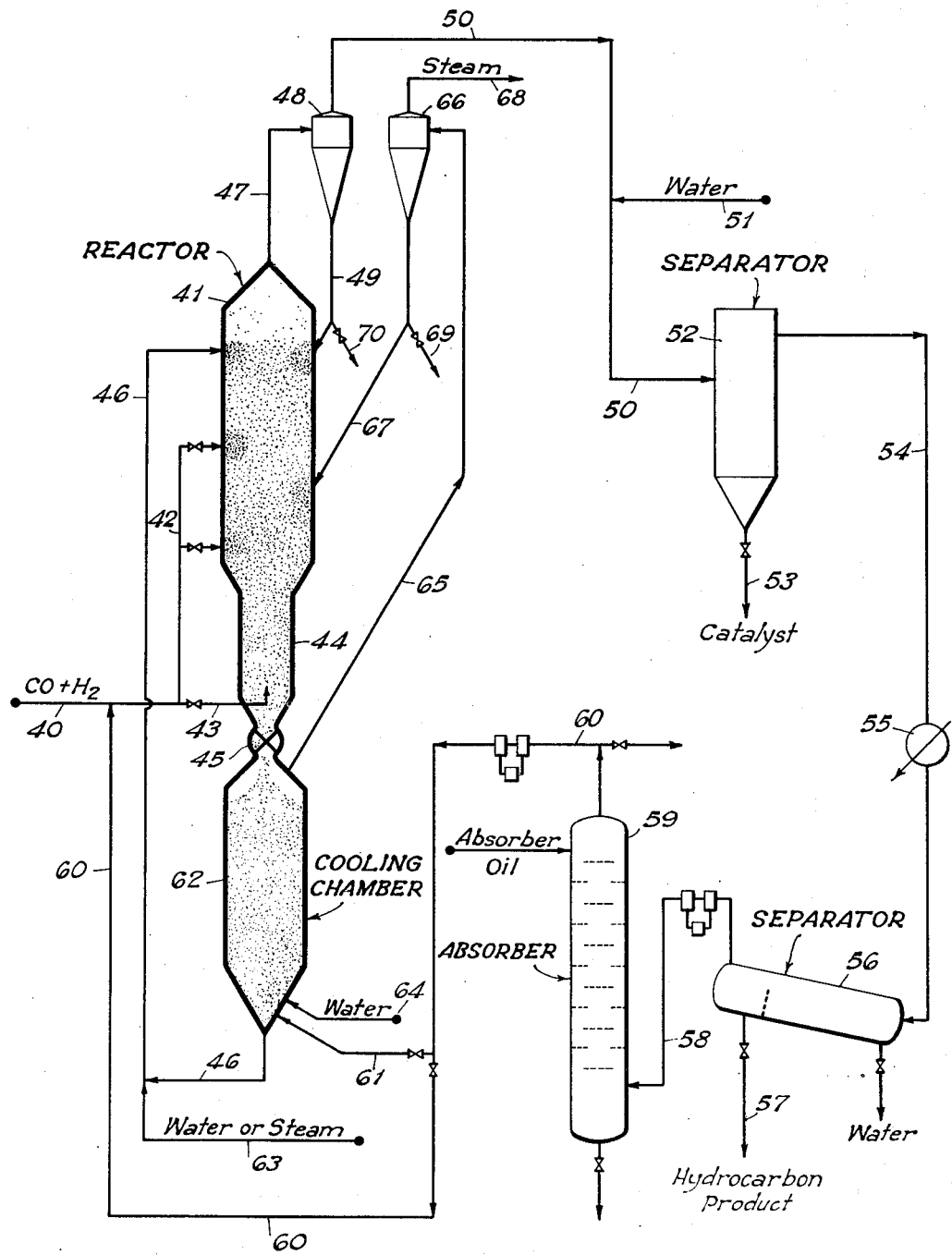

The invention is illustrated by drawings in which:

Figure 1 diagrammatically illustrates an apparatus for conducting exothermic gas reactions in the presence of a fluidized catalyst and for passing the catalyst through a catalyst-treating and revivification zone; and Figure 2 shows my invention applied to the synthesis of hydrocarbons by the exothermic conversion of hydrogen and carbon monoxide.

Referring to Figure 1, 10 is an exothermic reaction chamber; 11 is a cooler for granular heat transfer material; and 12 is a catalyst-supply reservoir and regenerator. In a typical reaction, the feed gas is supplied to the reaction chamber 10 by line 13, and the gases pass upwardly through the reactor 10 at a velocity sufficient to maintain the catalyst in suspension therein. Ordinarily, a linear velocity of between about 1 and about 10 feet per second, for example between about 1.5 and about 4 feet per second, is employed. The exothermic reaction is conducted within the chamber 10, and the reaction products are withdrawn by line 14 to cyclone separator 15 and thence transferred by line 16 to suitable product recovery means. Multiple cyclone separators of small diameter and of high efficiency may be used for recovering the catalyst from the gases. I may also employ ceramic filters, electrical precipitators, or suitable scrubbing devices for this duty. For example, I may scrub the gases from the reactor with an oil in which the catalyst is suspended as slurry and from which it can be recovered by filtration, settling, or otherwise are recycled to the system. Alternatively, the slurry of recovered catalyst can be injected directly into the reactor 10.

Depending upon the type and extent of catalyst contamination resulting from the exothermic reaction, the proportion of catalyst retained within the reactor as a dense fluent suspended phase and the proportion withdrawn overhead for regeneration can be controlled. In general, the catalyst remains in the reactor as a dense turbulent suspended phase having a density of between about 15 and about 80 pounds per cubic foot. In one method of operation, I maintain sufficiently high gas velocities within reactor 10 to carry the catalyst out of the top of the reactor with the product gases into the catalyst separation means 15. The catalyst is separated and conducted by line 17 to chamber 12 where the catalyst is contacted with other gases and then returned by line 18 to the reactor 10. Thus catalyst is continuously supplied to the reactor and the level of catalyst activity within the reactor 10 can be maintained substantially constant.

Various catalysts may be employed in reactor 10 in different types of exothermic conversion processes such as polymerization, hydrogenation, and the like. According to my invention, a catalyst in finely divided form, for example particles in the order of 100 to 400 mesh screen size or finer can be used. Such catalyst may include treated clays, bentonite, and the like. I may also employ active silica, silica gel, alumina, magnesia, zirconia, etc., either as a catalyst per se or in admixture or as supports for catalyst. However, in the conversion of hydrogen and carbon monoxide to synthesis products, I prefer to employ catalysts selected from the group VIII metals such as finely divided iron, cobalt, and nickel or their oxides. These synthesis catalysts can be associated with carriers or supports selected, for example, from the above group of refractory oxides.

In order to prevent undesired rise in temperature in reactor 10, there is introduced by line 19 at a high level therein a stream of granular cooling material having a different settling rate than that of the powdered catalyst. This material may be supplied at any temperature below the reaction temperature and the extent of cooling obtained is controlled by regulating the temperature of the cooling material and the amount or rate of introduction. In general, the cooling material can comprise granules having a particle size of approximately one-half to one-quarter mesh down to about 50 or 100 mesh, depending upon the composition of the material, its density, heat conductivity, and other factors. A suitable size for most purposes is 10 to 40 mesh. The solids which serve as a coolant may be crushed ceramic material, such as firebrick, subdivided metal, for example iron shot, aluminum pellets, and the like, sand, or other granular or preformed refractory material, such as a metal oxide, coke, carborundum, etc. The diluent solid can preferentially function as a sulfur acceptor by reacting therewith, the sulfur being removed by oxidation, reduction and/or steaming before recycle of the cooled diluent material to the reactor. A particularly useful coolant for this dual function may comprise cobalt, molybdenum, copper or cobalt molybdate supported on one of the above solids.

An important characteristic of the cooling material is that it have a settling rate differing from that of the catalyst employed. The rate of settling is determined by the size, shape, and density of the particles and in my preferred embodiment I select a cooling material whose particles, through greater size, more compact shape, and/or greater density, fall more rapidly through the gaseous medium than do the particles of catalyst. Where the density is about the same, it is preferred that the cooling agent have a screen size at least 50 mesh larger than that of the catalyst. Consequently when dispersed in an upflowing vapor stream having the proper velocity intermediate the settling rate of the catalyst and the cooling material, the former is buoyed up and maintained in suspension while the latter descends counter to the gasiform fluid stream.

Cooling material introduced at 19 commingles with the catalyst dispersed evenly throughout the reactor 10 and descends to the lower part of the reactor past the point of feed inlet supplied by pipe 13. From the bottom of the reactor, it passes through conduit 20 leading through valve means 21 into cooler 11, where the temperature of the cooling material is lowered, for example by injecting water, wet steam, cool hydrogen, naphtha or other volatile liquid hydrocarbon, natural gas, or other suitable gas or vapor through line 22. If desired, a small amount of steam, carbon dioxide, or other suitable stripping gas may be introduced by line 23 into downcomer 20 to purge the cooling material of carbon monoxide or reaction products occluded therein in reactor 10.

The cooling fluid introduced by line 21 into cooler 11 flows upwardly through the cooler and sweeps the granular cooling material. Water, injected at 22, is converted into steam, and the steam or other gases employed are withdrawn by line 24 leading to chamber 12. The supply of catalyst in 12 is kept agitated by a stream of gas, and the gas is withdrawn through cyclone separators 25 to recover fine catalyst which is returned to the supply through dip legs 26. The gases are thence discharged from separators 25 by line 27. Catalyst in 12 is conveyed back to the reactor 10 as hereinabove indicated by line 18. A suitable conveyor gas is injected into the line 18 through valved line 28 when necessary. When the cooling fluid is such as to be readily separated from the reaction products, a joint catalyst separation means for reactor and regenerator can be used.

The temperature employed within the reaction zone will depend upon the type of conversion desired. In hydrogenation reactions using chromium, molybdenum, or vanadium type of catalyst, either alone or supported on a carrier such as alumina, temperatures of 750 to 950° F. can be employed. In a typical hydrocarbon-synthesis operation, the temperature within the reactor 10 is desirably controlled at between about 400 and about 650° F. A temperature of the order of about 425 to 450° F. is useful in the synthol reaction when cobalt is the catalyst. Higher temperatures of the order of about 590 to 610° F., for example 600° F., are satisfactory when an iron-type catalyst is used.

The heat exchange solids having been reduced in temperature within the cooler 11 are allowed to descend through purging section 29, where occluded gas may be purged by a small amount of steam or other inert purging gas injected through line 30. The heat exchange material is then returned by line 19 to a high point in the reactor 10. A conveyor fluid, such as steam or a selected hydrocarbon fraction, is injected by valved line 31 into line 19. Other means for conveying the cooling material to the reactor, such as a chain bucket conveyor, are contemplated. The conveyor fluid should preferably be one which will not interfere with the product gases in the top of the reactor 10 and the drawoff line 14. If it is desired to accomplish further cooling of the noncatalytic heat exchange solids, a liquefied hydrocarbon which may be derived from the synthesis product, can be supplied via line 31. Depending upon the boiling point of the fraction selected the solids will be returned as a suspension or as a slurry to the reaction zone. In some instances, it will be desirable to employ the returned solids as an aid in recovering the catalyst from the reaction products.

If the velocity of the gasiform fluids flowing upwardly through the reactor 10 is carefully controlled to be about the same as the settling rate of the catalyst therein, the catalyst will largely remain within the reactor 10, only controlled portions being carried away with the gases in line 14. Likewise, by maintaining sufficient upflow vapor velocity in 20, very little catalyst escapes from the reactor with the cooling material. The use of a reaction vessel in the form of an inverted cone facilitates velocity control, higher at the bottom and lower at the top. Inasmuch as the catalyst in the synthol reaction retains its activity for substantial periods of time, it is not necessary to continuously transfer all of the catalyst from the reactor 10.

Diminution of the catalyst activity during the reaction may result from the deposition of hydrocarbons, sulfur, carbon, and the like. These contaminants can be removed, according to my process, by transferring the catalyst continuously or at selected intervals into chamber 12, for example by withdrawing overhead through line 14 or downwardly through 20. Substantial reduction in apparent density of iron catalyst has been observed when carbonaceous materials are carried by the catalyst and this favors withdrawal overhead.

A suitable regeneration gas is hydrogen or hydrogen-rich gas which removes sulfur as hydrogen sulfide and physically or chemically strips hydrocarbonaceous materials from the catalyst. The regeneration gas is withdrawn from the chamber 12 by line 27. This gas containing the contaminants may be treated for the removal of hydrogen sulfide and/or hydrocarbons and recycled to the cooler 11. Alternatively, hydrogen sulfide-free regeneration gas, with or without the hydrocarbons, can be introduced into the reactor 10. The regenerated catalyst is withdrawn downwardly from chamber 12 by line 18 and returned to the reactor 10 as hereinbefore indicated.

In another operation wherein the apparatus illustrated in Figure 2 is employed, a feed gas, e. g. a mixture of hydrogen and carbon monoxide in the ratio of between about 1:1 and about 3:1, is introduced by line 40 into reactor 41. Generally, the feed can be introduced at a single low point, for example by inlet 43. However, the ratio of hydrogen-to-carbon monoxide reacting can be varied by introducing the feed gas or an extraneous hydrogen-rich gas into the reactor 41 at a plurality of longitudinally spaced points, for example by manifold line 42. The lower section 44 of the reactor 41 can be of smaller cross-sectional area than the reactor proper, thereby permitting the accumulation of the coolant solid. The feed gases introduced at 43 pass upwardly through chamber 44 at a higher velocity than in the reactor 41. No appreciable portion of the synthesis catalyst can therefore leave the reactor with the granular cooling material. The synthesis catalyst is maintained within the reactor 41 proper, and the coolant solid will predominate in the chamber 44 which is in direct communication with reactor 41. When the coolant solids also have the property of functioning as sulfur acceptors, the feed gas is both preheated and desulfurized before contacting the bulk of the synthesis catalyst. The sulfur and sulfur compounds carried by the withdrawn solids ordinarily will be removed before the coolant solids are returned to the synthesis zone.

When synthesizing hydrocarbons by the conversion of hydrogen and carbon monoxide, I control the upward velocity of gasiform fluids within the reactor 41 to provide a catalyst density of between about 40 and about 70 pounds per cubic foot. Simultaneously, I may supply to the reactor from 5 to about 50 pounds per cubic foot of granular cooling material, making a total density of solids in the reactor of about 50 to 100 pounds per cubic foot. The high heat capacity of the mixture serves to act as a heat balance wheel to prevent local temperature increases beyond the desired range. In the preferred operation, both the catalyst and the cooling material are maintained in a free-flowing fluid suspension with a high proportion of the cooling material settling out. However, in one method of operation employing more coarsely granular cooling material, the cooling material may pass downwardly through the reactor in a moving bed; whereas the catalyst is retained in a dense turbulent suspended phase.

In a typical operation employing iron-type catalyst, a temperature of between about 525° F. and about 650° F., preferably with an average of between about 590 and about 600° F., is to be preferred. A space velocity of between about 10 and 80 cubic feet of feed gas per hour per pound of catalyst, for example, a space velocity of between about 35 and 55 can be used. A linear velocity of between about 1.5 and 4.0 feet per second will give the desired dense catalyst phase. Pressures of the order of about 25 to 50 p. s. i. may be used with cobalt catalyst, and higher pressures are beneficial with iron catalyst, pressures of 200 to 400 p. s. i., for example 250 p. s. i., being satisfactory.

The cooling material withdrawn through valve 45 passes downwardly through the chamber 62 and is withdrawn from a low point therein via line 46 and reintroduced into reactor 41 as a flowing stream generally fluidized by an aeration gas. The cooling fluid is introduced into chamber 62 by line 64 and a sufficient velocity of between about 2 and 20 feet per second can be used to maintain the cooling solids in a dense turbulent phase. A suitable fluid may be water injected at spaced vertical points. Likewise, any of the cooling fluids mentioned in connection with line 22 of Figure 1 may be employed. A useful arrangement is to preheat natural gas to be used in the production of hydrogen and carbon monoxide by contacting the natural gas with the hot solids. The preheated gas can be partially oxidized to produce the hydrogen and carbon monoxide for the synthesis.

The cooling fluid, together with any catalyst stripped from the cooling solids in 62, is withdrawn by line 65 and introduced into a catalyst separation means, illustrated as cyclone separator 66. The separated catalyst can be returned by line 67 to the reactor 41 and the cooling fluid is removed by line 68.

The reaction products and any entrained catalyst are removed overhead from the reactor 41 by line 47 leading to a catalyst separation means, illustrated as cyclone separator 48, in which any catalyst carried over is separated and returned through dip leg 49 to the reactor 41. It should be understood that the dip legs 49 and 67 can be aerated by injecting a suitable gas therein in small amounts to facilitate the flow and to prevent packing and plugging of the lines. Separated catalyst can be withdrawn via lines 69 and 70 and subjected to regeneration before being returned to the reactor 41. The regeneration can be effected by oxidation and/or by reduction of the metal catalyst. The oxidized or reduced catalyst can be returned directly to the synthesis zone. Likewise the catalyst can be oxidized and reduced in series or in parallel and returned to the synthesis zone.

A quench liquid, for example water, may be introduced at 51 and withdrawn along with catalyst from separator 52 as a slurry. This slurry of catalyst, withdrawn by line 53, can be returned to the reactor.

The products, withdrawn from separator 52 by line 54, pass through cooler 55 to separator 57. The water slurry removed from separator 52 normally will include the water of reaction, together with dissolved oxygenated compounds. In separator 56, liquid hydrocarbon products are separated and withdrawn by line 57. The uncondensed gases flow by line 58 to absorber tower 59 where additional reaction products are recovered in conventional manner. The dry gases, discharged by line 60, may be withdrawn from the system but may be beneficially recycled to the reactor by lines 60 and 40. Alternatively, a part of these gases, usually rich in hydrogen, may be injected by line 42 at spaced points along the reactor 41. Likewise, these gases may be introduced into cooling chamber 62 by line 61 to serve as a contacting medium for the solid heat-exchange material therein.

The granular heat-exchange solids pass from the chamber 62 following the contacting with the gases just described and are conducted by line 46 to a high point in the reactor 41. Transfer of cooling material may be facilitated by injecting into line 46 a vaporizable liquid, such as water or hydrocarbon, by line 63. The carrier gases are removed overhead from reactor 41 along with gaseous reaction products, separated, and recycled if desired.

From the above description, it will be apparent that I have provided a method and means for attaining the objects of this invention. Other modifications of the invention will become apparent to those skilled in the art in view of this disclosure, and it is not intended that the invention be limited to the specific details shown. Therefore, although I have described my invention with respect to certain embodiments thereof, it is intended that the scope be determined only by the appended claims.

I claim:

1. In an exothermic gas phase reaction wherein finely divided solid catalyst is contacted with a mixture of carbon monoxide and hydrogen at elevated temperature, and the resulting heat of reaction tends to increase the temperature beyond the desired operating range, the method of controlling the temperature of said exothermic reaction and of dissipating the heat of reaction which comprises maintaining a mass of finely divided iron catalyst within a reaction zone, introducing carbon monoxide and hydrogen at a low point in said reaction zone, withdrawing gaseous reaction products from the top of said reaction zone, intimately contacting with said catalyst a solid, granular heat-absorbing material, inert under the conditions of the reaction, having a higher settling rate than that of said catalyst while maintaining said catalyst in a dense turbulent suspended phase within the reaction zone, conducting said exothermic reaction in the presence of said catalyst and said solid granular heat-absorbing material, absorbing heat from said exothermic reaction in said solid granular heat-absorbing material as sensible heat thereof, separating the hot heat-absorbing material from the catalyst within said reaction zone by the classifying action of the stream of gasiform fluid passing upwardly in said zone, withdrawing the separated solids from a low point in said zone, cooling said heat-absorbing material outside said exothermic reaction zone, and introducing the relatively cool inert solid granular heat-absorbing material into said exothermic reaction zone at a high point therein.

2. The method of controlling the temperature of the highly exothermic synthol reaction wherein a mixture of hydrogen and carbon monoxide is contacted with a fluidized solid catalyst in dense suspension in a reaction zone which comprises distributing within said reaction zone a granular heat absorbing, inert, solid material unreactive at the conditions prevailing within said reaction zone, said material having a higher rate of settling than that of said catalyst, passing reactant hydrogen and carbon monoxide upwardly through said reaction zone at a velocity sufficient to maintain said catalyst in a fluidized dense phase suspension but insufficient to prevent the settling of said granular heat-absorbing, inert solids, withdrawing said granular solids from a low point in said reaction zone, cooling said granular solids outside the reaction zone, and supplying said cooled granular solids to said reaction zone at a high point therein and at a temperature lower than that maintained within said zone.

3. The method of controlling the temperature of an exothermic reaction of hydrogen and carbon monoxide and of dissipating the heat of reaction which comprises the steps of maintaining a mass of finely divided iron catalyst within a reaction zone, introducing carbon monoxide and hydrogen at a low point in said reaction zone, withdrawing gaseous reaction products from the top of said reaction zone, passing reacting gases upwardly through said mass to maintain said catalyst in a dense turbulent suspended phase, intimately contacting with said catalyst a solid heat-absorbing material having a greater settling rate from that of said suspended catalyst said material being inert under the conditions within said reaction zone, conducting said exothermic reaction in the presence of said catalyst and said solid granular heat-absorbing material, absorbing heat from said exothermic reaction as sensible heat of the added solids, thereby maintaining the temperature at about 590 to 610° F., separating the heated solids from the catalyst by the classifying action of the upwardly flowing stream of gasiform fluids within the reaction zone, withdrawing the separated solids from a low point in said zone, cooling said heat-absorbing material outside said exothermic reaction zone to a temperature substantially below the desired reaction temperature, and introducing the relatively cool solids into said exothermic reaction zone at a high point therein.

4. In an exothermic gas phase reaction wherein finely divided solid catalyst in dense fluid suspension is contacted with reacting gases at an elevated temperature and the resulting heat of reaction tends to raise the temperature beyond the desired operating range, the method of controlling the temperature of said exothermic reaction and of dissipating the heat of reaction which comprises introducing into said exothermic reaction a relatively cool solid granular heat-absorbing material inert at the conditions of said reaction, said material having a higher settling rate than the settling rate of said catalyst, maintaining intimate contact between said heat-absorbing material and said catalyst in the zone of said exothermic reaction until said reaction is substantially complete, whereby the temperature of the said heat-absorbing material is substantially increased, introducing said reacting gases at a low point in said reaction zone, withdrawing gaseous reaction products from the top of said reaction zone, separating the hot heat-absorbing material from the catalyst in said reaction zone by the classifying action of the upflowing stream of rapidly moving gases, withdrawing said heat-absorbing material from a low point and cooling it outside the zone of said exothermic reaction and thereafter reintroducing the cooled heat-absorbing material at a high point into said exothermic reaction.

5. The method of synthesizing hydrocarbons from a mixture of hydrogen and carbon monoxide in the presence of a catalyst which comprises the steps of maintaining a dense fluid mass of finely divided iron catalyst within a reaction zone, maintaining a mass of a granular, solid, heat-absorbing material, inert under the conditions of the reaction, in intimate contact with said catalyst, said material having a greater settling rate than that of said catalyst when suspended in gas, passing a current of hydrogen and carbon monoxide upwardly thru said reaction zone at a rate sufficient to maintain said catalyst in fluid suspension while permitting downward movement of said granular heat-absorbing material in said reaction zone thereby separating said catalyst and said granular heat-absorbing material, withdrawing partially spent catalyst from the reaction zone to a regeneration zone, withdrawing granular heat-absorbing material from a low point in said reaction zone to a cooling zone, contacting withdrawn granular heat-absorbing material in said cooling zone with a cooling gas thereby reducing its temperature substantially below the temperature of said reaction zone, separating said cooling gas from said granular heat-absorbing material and contacting it with catalyst in said regeneration zone, thereby regenerating said catalyst, introducing the cooled granular solid heat-absorbing material at a high point in said reaction zone and returning the regenerated catalyst from said regeneration zone to said reaction zone at a point below the point of introducing the granular heat-absorbing material thereinto.

EVERETT A. JOHNSON.